United States Patent
Woods et al.

(10) Patent No.: US 10,627,075 B2
(45) Date of Patent: Apr. 21, 2020

(54) LAMP ASSEMBLY AND MOLDING METHOD

(71) Applicant: Ford Motor Company, Dearborn, MI (US)

(72) Inventors: Derren Woods, Canton, MI (US); Todd Jared Konet, Canton, MI (US); Alex Lince, St. Clair Shores, MI (US); Daniel Weckstein, West Bloomfield, MI (US)

(73) Assignee: Ford Motor Company, Dearborn, MI (US)

( * ) Notice: Subject to any disclaimer, the term of this patent is extended or adjusted under 35 U.S.C. 154(b) by 158 days.

(21) Appl. No.: 15/466,931

(22) Filed: Mar. 23, 2017

(65) Prior Publication Data

US 2017/0314761 A1 Nov. 2, 2017

Related U.S. Application Data

(60) Provisional application No. 62/329,383, filed on Apr. 29, 2016.

(51) Int. Cl.
| | |
|---|---|
| *B60Q 3/60* | (2017.01) |
| *B60Q 3/82* | (2017.01) |
| *B29D 11/00* | (2006.01) |
| *F21V 5/00* | (2018.01) |
| *F21V 5/04* | (2006.01) |

(Continued)

(52) U.S. Cl.
CPC ............ *F21V 5/002* (2013.01); *B29C 45/16* (2013.01); *B29C 45/372* (2013.01); *B29D 11/00009* (2013.01); *B29D 11/0073* (2013.01); *B29D 11/00269* (2013.01); *B60Q 3/60* (2017.02); *B60Q 3/74* (2017.02); *B60Q 3/82* (2017.02); *F21V 5/045* (2013.01); *F21V 23/0485* (2013.01); *B29K 2995/0012* (2013.01); *B29L 2011/005* (2013.01)

(58) Field of Classification Search
CPC ...... F21V 23/0485; F21V 5/002; F21V 5/045; B29C 45/16; B29C 45/372; B29D 11/00009; B29D 11/00269; B29D 11/0073; B29K 2995/0012; B29L 2011/005; B60Q 3/82; B60Q 3/60; B60Q 3/74

See application file for complete search history.

(56) References Cited

U.S. PATENT DOCUMENTS 4,340,283 A * 7/1982 Cohen .................. G02B 5/1876
351/159.41
5,229,797 A * 7/1993 Futhey .................. A61F 2/1618
351/159.48

(Continued)

FOREIGN PATENT DOCUMENTS

EP 2594392 5/2013
JP 2014113828 A * 6/2014 .............. F21V 5/008

*Primary Examiner* — Arman B Fallahkhair
(74) *Attorney, Agent, or Firm* — Vincent Mastrogiacomo; Carlson, Gaskey & Olds, P.C.

(57) ABSTRACT

An exemplary lamp assembly includes a lens, a base, and a textured surface between an outwardly facing surface of the lens and an outwardly facing surface of the base. An exemplary lamp molding method includes injecting a first material into a mold cavity to form a lens, and injecting a second material against a textured surface of the lens within the mold cavity to form a base.

15 Claims, 5 Drawing Sheets

(51) Int. Cl.
*F21V 23/04* (2006.01)
*B29C 45/37* (2006.01)
*B60Q 3/74* (2017.01)
*B29C 45/16* (2006.01)
*B29L 11/00* (2006.01)

(56) References Cited

U.S. PATENT DOCUMENTS

| | | | | |
|---|---|---|---|---|
| 7,674,025 | B2 * | 3/2010 | Liesener | B29C 45/16 |
| | | | | 362/487 |
| 7,841,715 | B1 * | 11/2010 | Morrison | G02C 7/081 |
| | | | | 351/159.48 |
| 9,242,418 | B2 | 1/2016 | Shan et al. | |
| 9,475,427 | B2 * | 10/2016 | Tahara | H03K 17/962 |
| 2015/0356895 | A1 * | 12/2015 | Boppart | G06F 13/0404 |
| | | | | 362/511 |

* cited by examiner

LAMP ASSEMBLY AND MOLDING METHOD

CROSS-REFERENCE TO RELATED APPLICATIONS

This application claims priority to U.S. Provisional Application No. 62/329,383, which was filed on 29 Apr. 2016 and is incorporated herein by reference.

BACKGROUND

This disclosure relates generally to a lamp assembly and, more particularly, to a molded lamp assembly having a textured surface on a lens, a base, or both.

Lamp assemblies are used to illuminate, for example, a cabin area of a vehicle. A textured surface can enhance lamp assembly aesthetics. A textured surface can redirect light moving through the lamp assembly. A textured surface can complicate incorporating other structures into the lamp assemblies, such as a capacitive sensor.

SUMMARY

A lamp assembly according to an exemplary non-limiting embodiment of the present disclosure includes, among other things, a lens, a base, and a textured surface between an outwardly facing surface of the lens and an outwardly facing surface of the base.

In a further non-limiting embodiment of the foregoing lamp assembly, the textured surface comprises both a textured surface of the lens, and a textured surface of the base.

In a further non-limiting embodiment of any of the foregoing lamp assemblies, the textured surface of the lens has a profile that is the same as a profile of the textured surface of the base such that the textured surface of the lens meshes with the textured surface of the base.

In a further non-limiting embodiment of any of the foregoing lamp assemblies, the textured surface of the lens connects directly to the textured surface of the base.

In a further non-limiting embodiment of any of the foregoing lamp assemblies, the lens is transparent and the base is opaque.

In a further non-limiting embodiment of any of the foregoing lamp assemblies, the textured surface comprises a plurality of protrusions.

In a further non-limiting embodiment of any of the foregoing lamp assemblies, the plurality of protrusions each have a triangular cross-sectional profile.

In a further non-limiting embodiment of any of the foregoing lamp assemblies, the textured surface comprises a plurality of separate and distinct surfaces that are angled relative to each other.

In a further non-limiting embodiment of any of the foregoing lamp assemblies, the textured surface comprises ring-shaped protrusions arranged in a Fresnel pattern.

In a further non-limiting embodiment of any of the foregoing lamp assemblies, the outwardly facing surface of the lens is smooth relative to the textured surface.

A further non-limiting embodiment of any of the foregoing lamp assemblies includes a capacitive sensor component between the base and a light source within a vehicle.

A lamp molding method includes, among other things, injecting a first material into a mold cavity to form a lens, and injecting a second material against a textured surface of the lens within the mold cavity to form a base.

In a further non-limiting embodiment of the foregoing lamp molding method, the textured surface is between an outwardly facing surface of the lens and an outwardly facing surface of the base.

A further non-limiting embodiment of any of the foregoing lamp molding methods includes separating a core side of a mold from the lens prior to injecting the second material and holding the lens during the separating with a mold insert.

In a further non-limiting embodiment of any of the foregoing lamp molding methods, a heat deflection temperature of the first material is higher than a heat deflection temperature of the second material such that the second material does not melt the first material.

In a further non-limiting embodiment of any of the foregoing lamp molding methods includes holding the second material as the second material cures with the textured surface of the lens to provide a textured surface in base.

A further non-limiting embodiment of any of the foregoing lamp molding methods includes moving the first material through a first nozzle in a first direction to a first runner prior to injecting the first material, and moving the second material through a second nozzle in a second direction to a second runner prior to injecting the second material. The first direction is transverse to the second direction.

A further non-limiting embodiment of any of the foregoing lamp molding methods includes injecting the first material through a first gate, and injecting the second material through a second gate that is offset from the first gate.

In a further non-limiting embodiment of any of the foregoing lamp molding methods, the textured surface comprises a plurality of protrusions.

In a further non-limiting embodiment of any of the foregoing lamp molding methods, the textured surface comprises a plurality of separate and distinct surfaces that are angled relative to each other.

DETAILED DESCRIPTION

Referring to FIGS. 1-6, an example lamp assembly 10 includes a lens 14 and a base 18. The example lamp assembly 10 is utilized as an overhead console map lamp for a passenger compartment of a vehicle, in one example. The techniques and teachings of this disclosure could be applied to lamp assemblies for other environments, such as a lamp assemblies used outside the passenger compartment.

The lens 14 is made of a relatively clear polymer material, whereas the base 18 is opaque. An outwardly-facing side 22 of the lens 14 is smooth. In some specific examples, the outwardly-facing side 22 is highly polished and mirror-like. An opposing, inwardly-facing side 26 of the lens 14 incorporates a textured surface 30. An outwardly-facing side 36 of the base 18 is smooth. An opposing, inwardly-facing side 40 of the base 18 incorporates a textured surface 44.

Figures 4, 5:
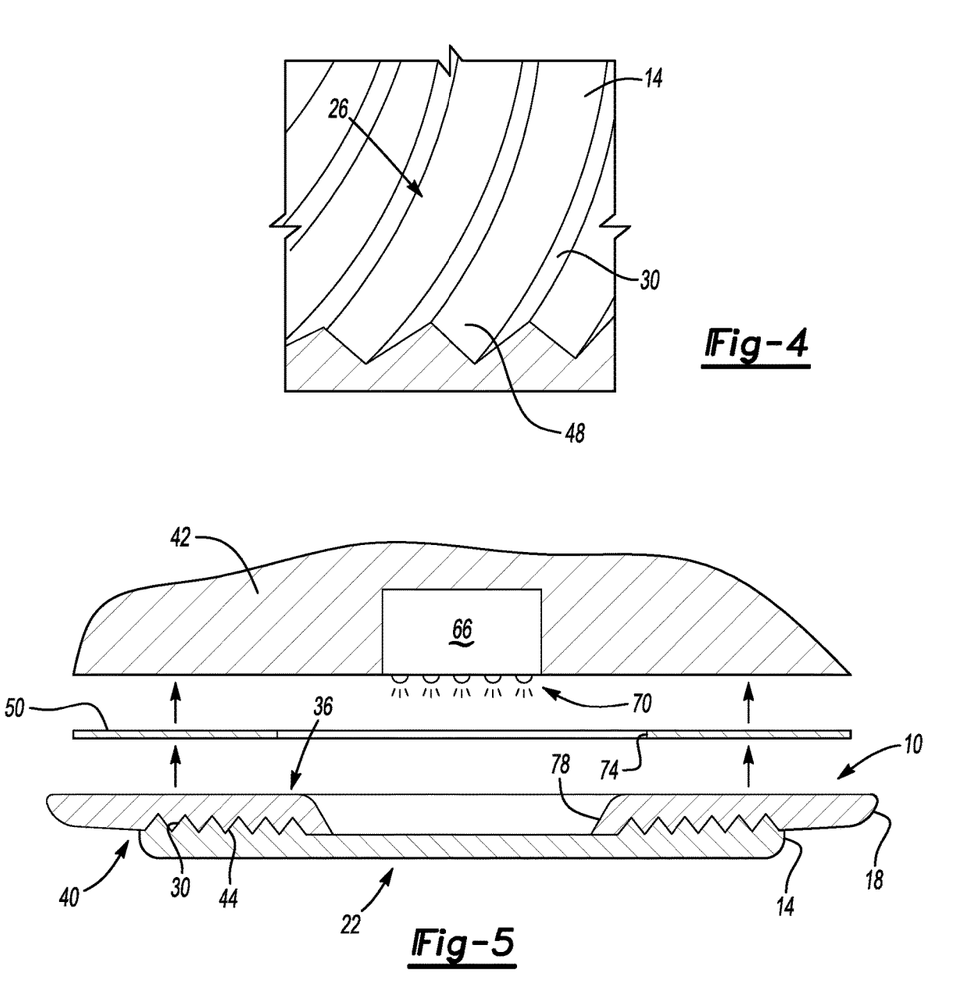
FIG. 4 shows a close-up, partial section view of a portion of a textured surface from the lens of FIG. 3.
FIG. 5 shows a section view of the lamp assembly at Line 5-5 in FIG. 2 moving to an installed position within a vehicle.
Figure 6:
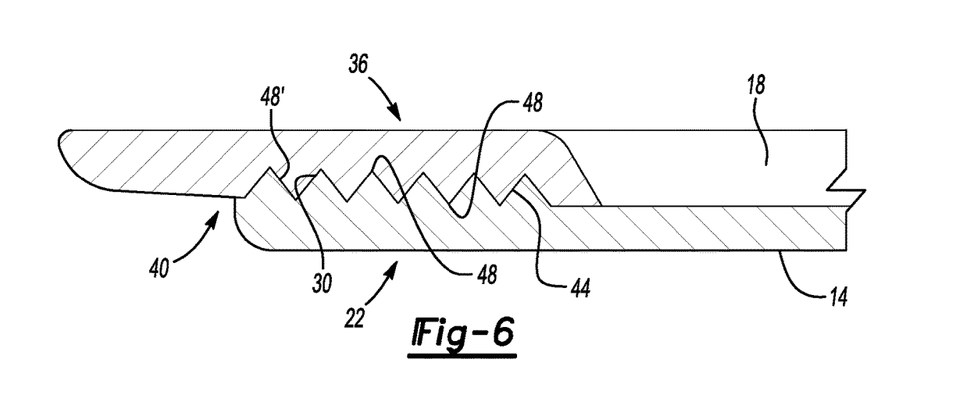
FIG. 6 shows a close up view of an area of the section of FIG. 5.

The textured surface 30 and the textured surface 44 are structured surfaces that comprise protrusions 48 or ridges in this example. To provide the protrusions 48, the textured surface 30 and the textured surface 44 have a plurality of separate and distinct surfaces that are angled relative to each other. A stippled surface, in contrast to the textured surface 30 and the textured surface 44, would not include a plurality of separate and distinct surfaces that are angled relative to each other.

The example protrusions 48 have a triangular-shaped cross-sectional profile. Other examples could incorporate protrusions 48 having some other profile, such as a rectangular-shaped profile or a dome-shaped profile. Other examples could incorporate depressions instead of, or in addition to, the protrusions 48. The depressions could have a cross-sectional profile that triangular-shaped, rectangular-shaped, dome-shaped, or some other profile.

Figure 1:
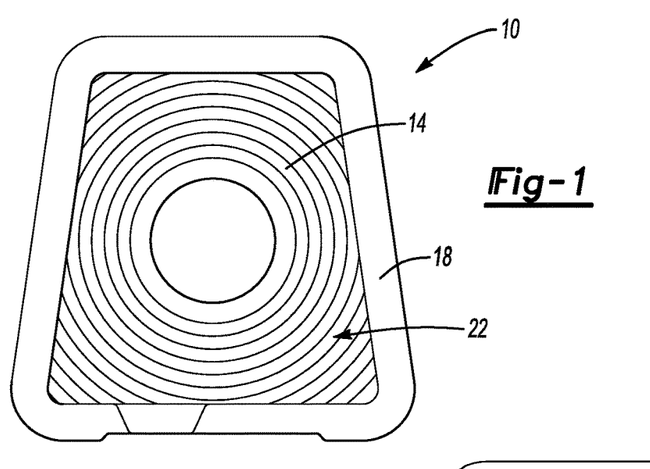
FIG. 1 shows an outer side of an example lamp assembly.
Figure 2:
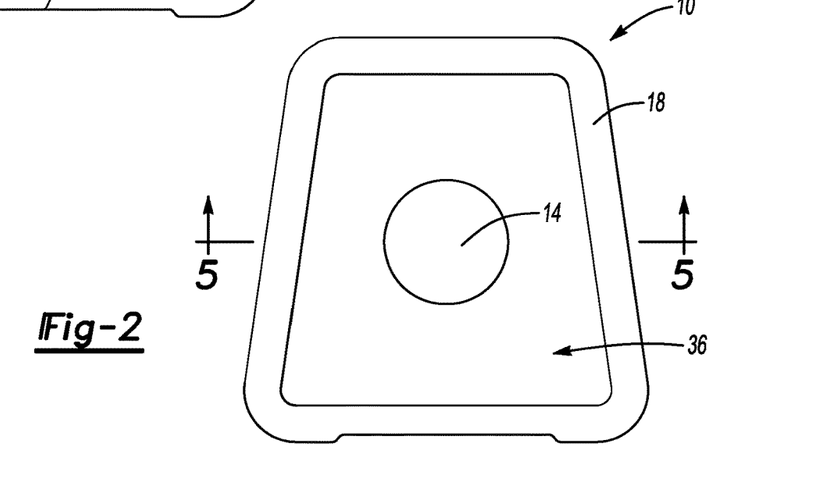
FIG. 2 shows an opposing, inner side of the lamp assembly of FIG. 1.
Figure 3:
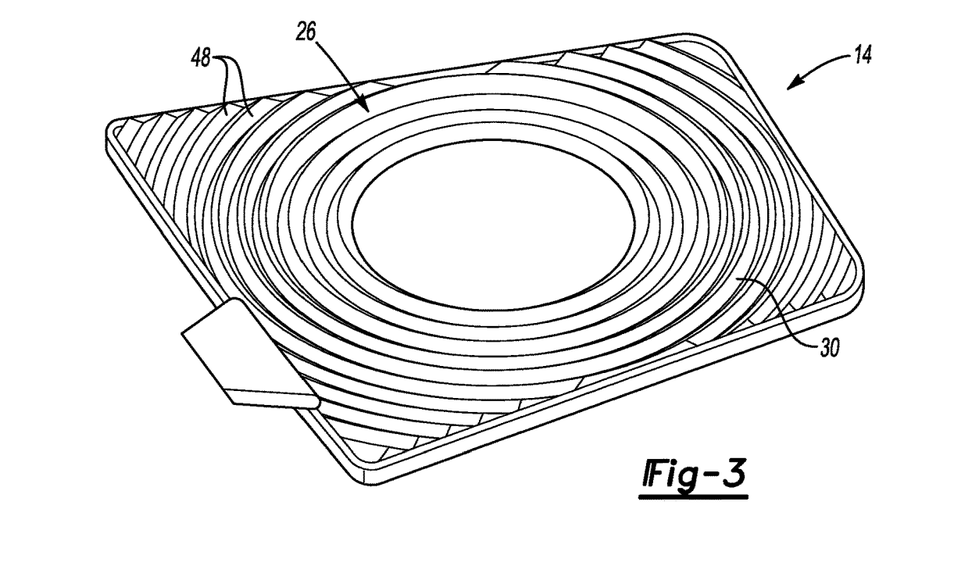
FIG. 3 shows a perspective view of a lens from the lamp assembly of FIG. 1.

The example protrusions 48 are ring shaped and have a Fresnel pattern. The Fresnel pattern provides the lamp assembly 10 with a desired aesthetic quality. The Fresnel pattern also alters the light beam in a desired manner.

The textured surface 30 and the textured surface 44 could have other configurations in other examples. Other configurations could be incorporated depending on aesthetic desires, requirements for altering light, or both. The other configurations could have a pattern that is repeated across the lens 14 and the base 18, or could be arranged in non-repeating way. The other configurations could include the protrusions 48, depressions, or some combination of these.

The textured surface 30 and the textured surface 44 are positioned within the lamp assembly 10 between the outwardly-facing side 22 of the lens 14 and the outwardly-facing side 36 of the base 18. The textured surface 30 of the lens 14 meshes together with the textured surface 44 of the base 18 within the lamp assembly 10. The textured surface 30 is configured to connect directly to the textured surface 44 such that there are no gaps between the textured surface 30 and the textured surface 44. The profile of the textured surface 30 is thus the same as the profile of the textured surface 44.

In this example, the textured surface 30 and the textured surface 44 are internal and are not exposed. The lens 14 is directly connected to the base 18 through the textured surface 30 and 44.

When installed within the vehicle, the outwardly-facing side 22 of the lens 14 faces the passenger compartment. The outwardly-facing side 22 of the lens 14 substantially provides an A-side surface of the lamp assembly 10. When installed within the vehicle, the outwardly-facing side 36 of the base 18 faces and directly connects to an overhead console 42 of the vehicle. The outwardly-facing side 36 of the base 18 substantially provide a B-side surface of the lamp assembly 10.

A capacitive sensor component 50, such as a sheet of copper material, can be placed directly against the outwardly-facing side 36 between the lamp assembly 10 and the overhead console. The outwardly-facing side 36 being smooth and uninterrupted and thus facilitates incorporating the capacitive sensor component 50. If, for example, the outwardly-facing side 36 included a textured surface, the textured surface could inhibit the outwardly-facing side 36 from robustly interfacing with the capacitive sensor component 50.

When incorporated within the vehicle, the lamp assembly 10 is placed over a light source 66, such as an LED-based lamp. The light source 66 can generate a light beam 70 in response to a vehicle occupant placing their hand near the capacitive sensor component 50. The light beam 70 passes through an aperture 74 in the capacitive sensor component 50, an aperture 78 in the base 18, and through the lens 14 into the vehicle cabin.

Again, the lens 14 is constructed of a relatively clear, polymer, optic-grade material, which permits the light beam 70 to pass through the lens 14 to the passenger compartment. The base 18, in this example, is relatively opaque polymer material, and could be white or some other color. The lens 14 extends across the aperture 78 in the base 18.

The lamp assembly 10 is injection molded utilizing a two-shot injection molding process. The first shot provides the lens 14. The second shot provides the base 18. The two-shot process facilitates incorporating the textured surface 30 and the textured surface 44 within the lamp assembly 10 between the outwardly-facing side 22 of the lens 14 and the outwardly-facing side 36 of the base 18.

Figure 7:
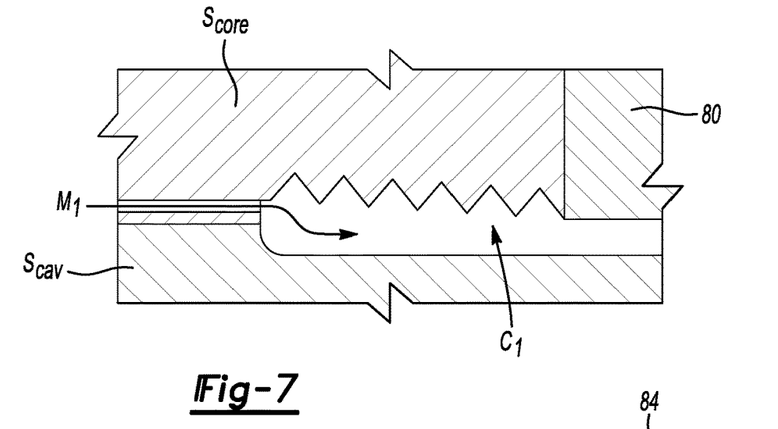
FIG. 7 shows a portion of a mold assembly providing a cavity to form the lens of FIG. 3.

Referring now to FIG. 7, during the injection molding process, a liquid material $M_1$ is moved into a cavity $C_1$ provided between a core side $S_{core}$ and a cavity side $S_{cav}$ of a mold. The material $M_1$ hardens within the cavity $C_1$ to form the lens 14 (FIG. 5). The material $M_1$ is a polycarbonate Sabic Lexan 143R-111 material in this example.

The core side $S_{core}$ of the mold provides the textured surface 30 in the lens 14 in this example. After the material $M_1$ has hardened, the core side $S_{core}$ is separated from the lens 14. Optical requirements may require forming the lens 14 prior to the base 18.

Figure 8:
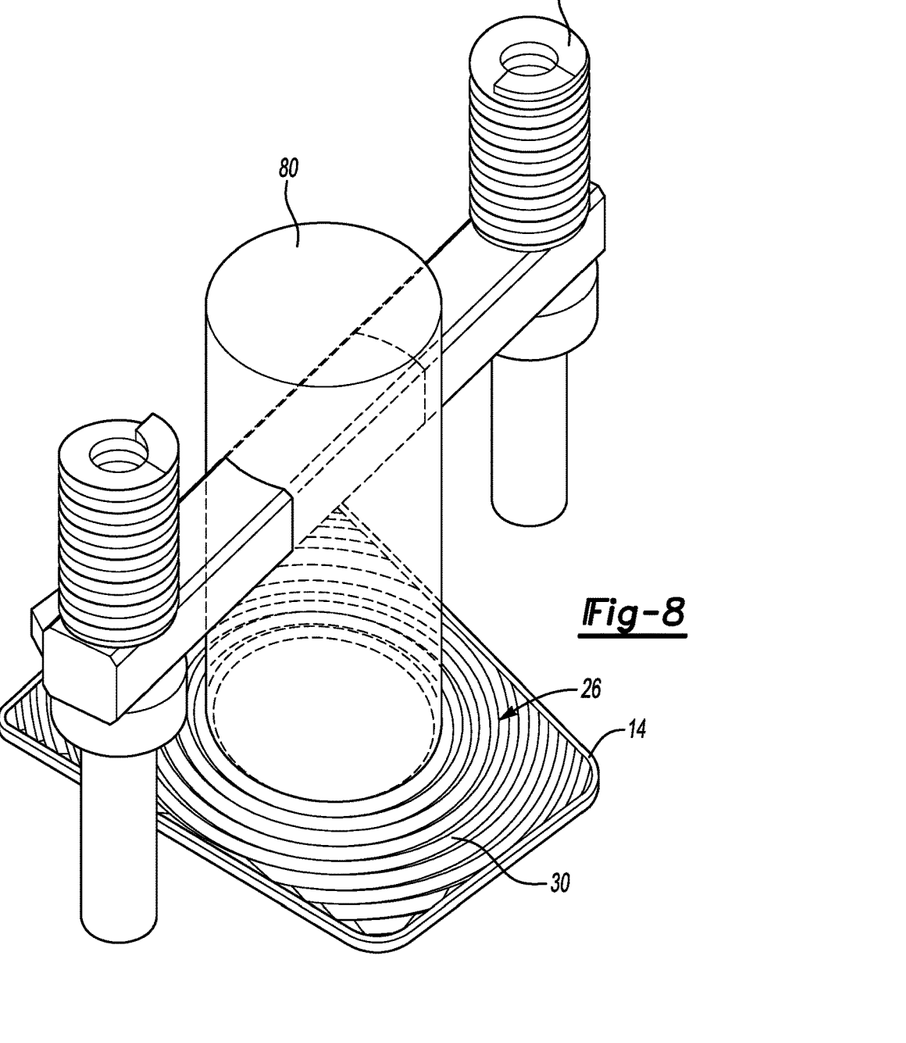
FIG. 8 shows a mold insert of the mold assembly of FIG. 7.
Figure 9:
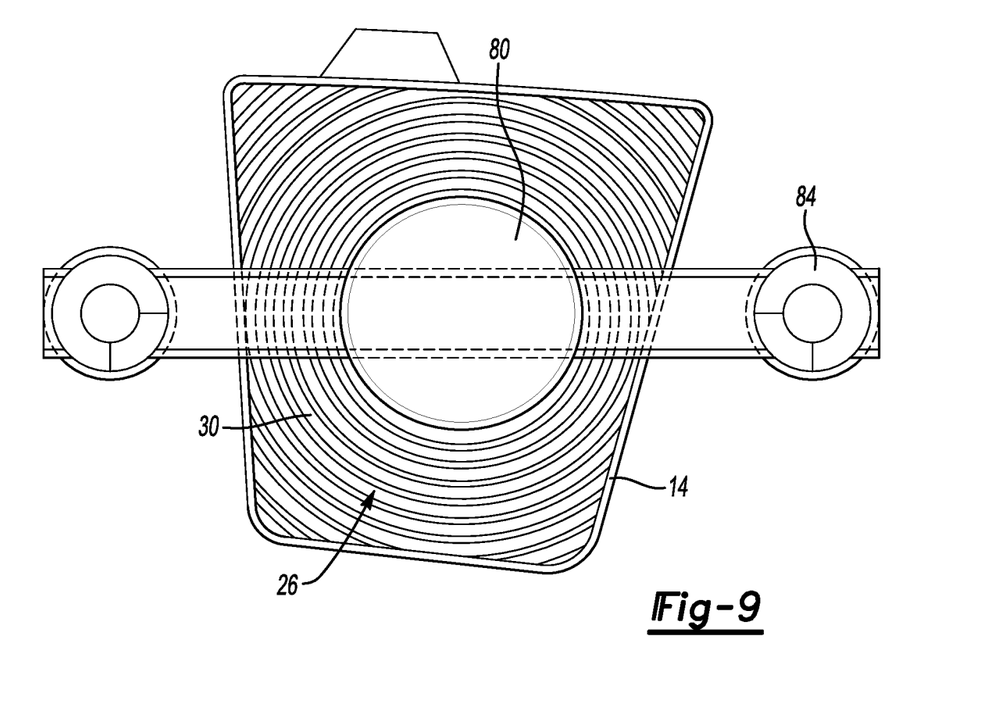
FIG. 9 shows a top view of the mold insert of FIG. 8.

Referring to FIGS. 8 and 9 with continuing reference to FIG. 7, a mold insert 80 holds the lens 14 within the cavity $C_1$ as the core side $S_{core}$ is separated and while the injection molding tooling is manipulated into a position appropriate for the second shot to form the base 18. The mold insert 80 facilitates separating the lens 14 from the core side $S_{core}$ and keeping the lens 14 in the cavity side $S_{cav}$ as the injection molding tool is manipulated into position for the second shot.

The example mold insert 80 incorporates springs 84 providing a biasing force that holds the lens 14 within the cavity side $S_{cav}$ as the lens 14 is separated from the core side $S_{core}$. The mold insert 80 prevents the lens 14 from sticking within the cavity side $S_{cav}$. If not for the mold insert 80, the lens 14 could stick into the cavity side $S_{cav}$ due to resistance between the textured surface 30 and the cavity side $S_{cav}$. The spring loaded design makes the restraining action automatic when the lens 14 is separated from the core side $S_{core}$.

Figure 10:
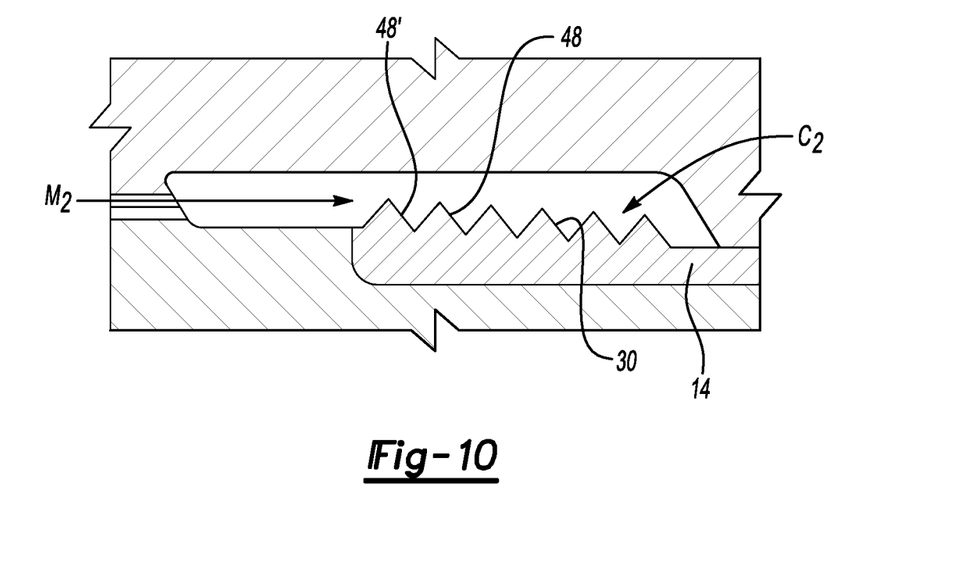
FIG. 10 shows a portion of a mold assembly providing a cavity to form a base of the lamp assembly of FIG. 1.

Referring now to FIG. 10, with the lens 14 remaining in the cavity side $S_{cav}$, the injection molding process next injects a second shot of material $M_2$ into a cavity $C_2$ to form the base 18. The second shot moves the material $M_2$ directly against the textured surface 30 in the lens 14. The second shot layers the material $M_2$ over the lens 14. The material $M_2$ of the second shot hardens to form the base 18 (FIG. 5). The material $M_2$ is a polycarbonate Sabic Lexan HFD1830-WH9G415 material in this example. Notably, in this example, a Heat Deflection Temperature for the material $M_1$ in FIG. 7 is greater than a melting Heat Deflection Temperature of the material $M_2$ so that the material $M_2$ does not melt the lens 14 during molding.

A protrusion 48' of the textured surface 30 near where the material $M_2$ enters the cavity $C_2$ could be modified relative to the other textured surface 30 to facilitate flow of the material $M_2$. For example, a height of the protrusion 48' could be reduced relative to other protrusions 48 of the textured surface 30 of the lens 14.

If the lens 14 and the base 18 were instead injection molded as separate components and then brought together to provide the lamp assembly 10, manufacturing tolerances and other factors could introduce gaps or inconsistencies between the textured surface 30 and the textured surface 44. Since the second shot moves the material $M_2$ directly against the textured surface 30 in the lens 14, the textured surface 30 interfaces directly with the textured surface 44 of the base, and a likelihood for gaps between the textured surface 30 of the lens 14 and the textured surface 44 of the base 18 is reduced. The two-shot injection molding process utilized to form the lamp assembly 10 thus provides a consistent interface between the textured surface 30 and the textured surface 44.

Some injection molding processes, such as insert molding, would require removing the lens 14 from the cavity during the injection molding. Removing the lens 14 would increase cycle time and introduce potential for further inconsistencies between the textured surface 30 and the textured surface 44. The example injection molding process provides improved cycle time over such a process since the lens 14 remains in the same cavity $C_1$ throughout the injection molding process. Put another way, removing the lens 14 from the cavity $C_1$ and placing the lens 14 into another cavity, which takes time, is not required.

Figure 11:
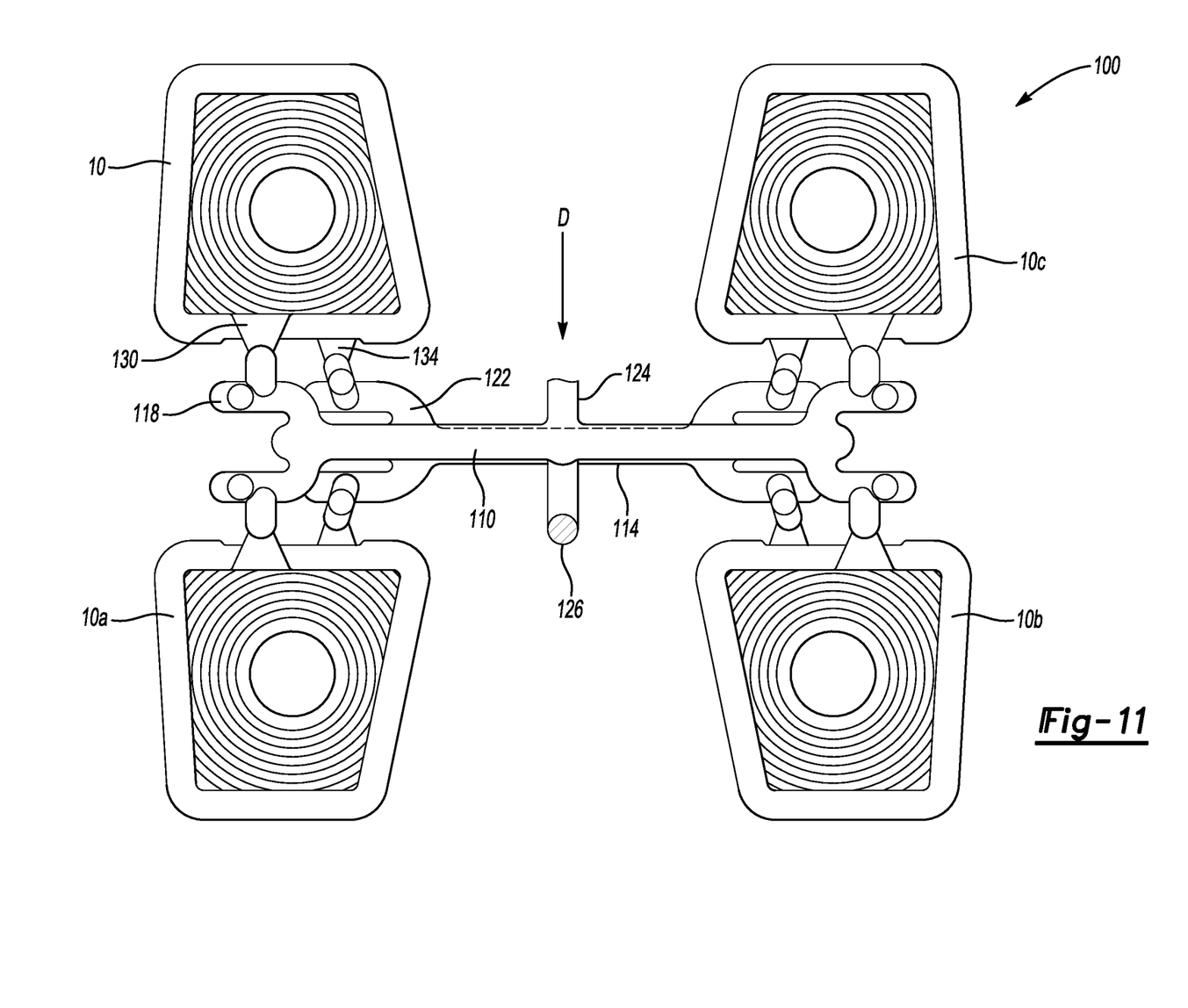
FIG. 11 shows a molded assembly incorporating the lamp assembly of FIGS. 1 and 2 and three additional lamp assemblies.

Referring now to FIG. 11 with continuing reference to FIG. 5, an injection molded part 100 is produced utilizing the injection molding techniques described above. The injection molded part 100 includes the lamp assembly 10 and three additional lamp assemblies 10a, 10b, and 10c. Material 110 represents a position of a runner within the injection molding tooling. Material 114 (beneath material 110 in FIG. 11) represents a position of a second runner within the injection molding tool. The first runner carries material $M_1$ to form the lenses 14 during the first shot. The second runner carries the material $M_2$ material to form the bases 18 during the second shot.

The example runners are cold runners that do not add thermal energy to the material $M_1$ and material $M_2$. Hot runners could add thermal energy to the material $M_1$ and material $M_2$, which can remelt material and introduce inconsistencies at the interface between the textured surface 30 and the textured surface 44. The cold runners can further help mitigate gate shear where the material $M_1$ and the material $M_2$ would wash or push away one another during injection molding, especially when relatively fast fill rates are used to decrease cycle time. The gate shear, if permitted, can result in appearance defects.

The cold runners incorporate curved cold slug areas in areas represented by material 118 and 122. The cold slugs can capture potentially contaminated material during the injection molding process, including any remelted material.

In this example, the material $M_1$ moves through a first nozzle to the first runner in a first direction D, and the material $M_2$ moves through a second nozzle in another, second direction. The location of the first nozzle is represented by material 124, and the location of the second nozzle is represented by the material 126. In this example, the second direction extends out of the page in FIG. 11 and is perpendicular to the direction D.

In a convention injection molding configuration, nozzles used to communicate material to two runners would be positioned side-by-side. The nozzles of this disclosure, due to their generally perpendicular offset, can reduce likelihood of remelt due to thermal energy transferring from the material moving through the first nozzle and the material moving through the second nozzle. The perpendicular arrangement of the first and second nozzles can facilitate using the cold runners.

Material enters the cavity $C_1$ during the first shot through a first gate 130. Material enters a cavity $C_2$ during the second shot through a second gate 134. The first gate 130 is offset or "split" from the second gate 134. Accordingly, the second shot fills the cavity $C_2$ at a position spaced from the first gate 130. After the first shot, areas of the mold near the first gate 130 would be relatively hot compared to other areas of the mold. Spacing the second gate 134 from the first gate 130 can reduce the likelihood for these relatively hot areas of the mold to remelt material moving through the second gate 134 into the cavity $C_2$ to form the base 18. Again, avoiding or reducing remelt can facilitate a clean and consistent interface between the textured surface 30 and the textured surface 44.

Features of the disclosed examples include a lamp assembly 10 that contains the textured surface 30 and the textured surface 44, but provides relatively flat and consistent class A and class B surfaces. An area of the mold utilized to form the protrusions 48 on the base 18 is not required since the two-shot process permits forming the base 18 directly against the patterned area of the lens 14.

The lamp assembly 10 effectively hides the internal workings of the lens if the optics are not styled. The aperture 78 is the exclusive aperture within the assembly 10 intended to permit passage of the light beam 70. The lamp assembly 10 provides a layered two-shot design that preserves an optic grade of the lens and its effective geometry.

Further, the "floating insert" utilized to retain the lens within the cavity during molding facilitates the molding process by enabling the lens to be removed from the core and retained in the cavity during actuations of the injection molding tool.

Yet another feature is the ability to contain decorative pattern within a dual layered lamp assembly design due to, among other things, a specific nonconventional sequence to the molding process; a unique mold tool design of gates and ejectors; eliminating a need for textured B side surface in tooling; effectively hiding the "guts" of lens if optics are not styled, (the only opening is light aperture); a layered two-shot design preserves optic grade first layer with effective geometry; and a unique floating insert developed to strip part off core and keep it in cavity while the tool flips. The spring loaded design makes action automatic when ejection occurs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A lamp assembly for a vehicle overhead console, comprising: a light source; a lens having an outwardly facing surface that faces away from the light source; a base having an outwardly facing surface that faces toward the light source, the outwardly facing surface of the base being smooth; a textured surface on an inwardly facing surface of the lens that directly meshes with a textured surface on an inwardly facing surface of the base; and a capacitive sensor component provided between the light source and the outwardly facing surface of the base; wherein, the capacitive sensor component includes an aperture to permit a light beam from the light source to pass, the base is opaque and includes an aperture to permit the light beam from the light source to pass, and the lens extends over the aperture of the base.

2. The lamp assembly of claim 1, wherein the textured surface comprises a plurality of protrusions.

3. The lamp assembly of claim 2, wherein the plurality of protrusions each have a triangular cross-sectional profile.

4. The lamp assembly of claim 1, wherein the base has an opening to accommodate the lens.

5. The lamp assembly of claim 4, where the textured surface of the base contacts the textured surface of the lens only in outer peripheral regions of the opening.

6. The lamp assembly of claim 1, wherein the textured surface of the lens has a profile that is the same as a profile of the textured surface of the base.

7. The lamp assembly of claim 1, wherein the lens is transparent.

8. The lamp assembly of claim 1, wherein the textured surface comprises a plurality of separate and distinct surfaces that are angled relative to each other.

9. The lamp assembly of claim 1, wherein the textured surface comprises ring-shaped protrusions arranged in a Fresnel pattern.

10. The lamp assembly of claim 1, wherein the outwardly facing surface of the lens is smooth relative to the textured surface.

11. The lamp assembly of claim 1, wherein the inwardly facing surface of the lens includes the textured surface of the lens, and the inwardly facing surface of the base includes the textured surface of the base.

12. The lamp assembly of claim 1, wherein the inwardly facing surface of the lens is opposite the outwardly facing surface of the lens, and the inwardly facing surface of the base is opposite the outwardly facing surface of the base.

13. The lamp assembly of claim 1, where the light source comprises at least one light emitting diode.

14. A lamp assembly for a vehicle overhead console, comprising: a light source; a lens having cm outwardly facing surface that faces away from the light source and a lens textured surface on an inwardly facing surface of the lens; a base having a smooth outwardly facing surface that faces toward the light source and a base textured surface on an inwardly facing surface of the base that directly meshes with the lens textured surface, the base being opaque and having an aperture configured to permit passage of a light beam from the light source to the lens, a capacitive sensor component provided between the light source and the smooth outwardly facing surface of the base, the capacitive sensor component including an aperture to permit the light beam from the light source to pass, and the lens extends over the aperture of the base.

15. The lamp assembly of claim 14, wherein the lens is transparent.

* * * * *

UNITED STATES PATENT AND TRADEMARK OFFICE
CERTIFICATE OF CORRECTION

PATENT NO. : 10,627,075 B2
APPLICATION NO. : 15/466931
DATED : April 21, 2020
INVENTOR(S) : Derren Woods et al.

It is certified that error appears in the above-identified patent and that said Letters Patent is hereby corrected as shown below:

In the Claims

In Claim 14, Column 8, Line 15; replace "a lens having cm outwardly" with --a lens having an outwardly--

Signed and Sealed this
First Day of March, 2022

Drew Hirshfeld
*Performing the Functions and Duties of the
Under Secretary of Commerce for Intellectual Property and
Director of the United States Patent and Trademark Office*